United States Patent
Kinnunen et al.

(10) Patent No.: US 6,856,802 B1
(45) Date of Patent: Feb. 15, 2005

(54) METHOD AND APPARATUS FOR MEASURING AND OPTIMISING THE QUALITY OF DATA TRANSMISSION

(75) Inventors: Jukka Kinnunen, Tampere (FI); Jussi Numminen, Turku (FI); Markku Lintinen, Kangasala (FI); Esa Nokkonen, Tampere (FI); Juha Savolainen, Tampere (FI); Pekka Jokitalo, Oulu (FI)

(73) Assignee: Nokia Mobile Phones Ltd., Espoo (FI)

( * ) Notice: Subject to any disclaimer, the term of this patent is extended or adjusted under 35 U.S.C. 154(b) by 0 days.

(21) Appl. No.: 09/538,082

(22) Filed: Mar. 29, 2000

(30) Foreign Application Priority Data

Mar. 29, 1999 (FI) .................................................. 990690
May 7, 1999 (FI) .................................................. 991062
Jul. 12, 1999 (FI) .................................................. 991594

(51) Int. Cl.[7] .............................................. H04Q 7/20
(52) U.S. Cl. ................. 455/425; 455/67.11; 455/67.14; 370/241; 375/224
(58) Field of Search ................................ 455/423, 425, 455/67.11, 67.14, 226.1, 418, 419; 375/224, 225, 226; 370/241, 242, 252

(56) References Cited

U.S. PATENT DOCUMENTS

| | | | |
|---|---|---|---|
| 3,895,298 A | 7/1975 | Schollmeier | 325/49 |
| 4,415,770 A | 11/1983 | Kai et al. | 179/2 EB |
| 4,710,925 A | 12/1987 | Negi | 371/5 |
| 5,305,384 A | 4/1994 | Ashby et al. | 380/29 |
| 5,425,076 A | 6/1995 | Knippelmier | 379/27 |
| 5,570,373 A | * 10/1996 | Wing | 455/423 |
| 5,726,991 A | 3/1998 | Chen et al. | 371/5.1 |
| 5,784,406 A | 7/1998 | DeJaco et al. | 375/224 |
| 5,790,523 A | 8/1998 | Ritchie, Jr. et al. | 370/241 |
| 5,943,617 A | 8/1999 | Nakamura | 455/423 |
| 6,687,499 B1 | * 2/2004 | Numminen et al. | 455/423 |

OTHER PUBLICATIONS

Patent Abstract of Japan Publication No. 10–028088.
Patent Abstract of Japan Publication No. 02–158222.
Patent Abstract of Japan Publication No. 01–174025.
Partial Translation of Japanese Unexamined Patent Publication (KOKAI) No. 9–205675.

* cited by examiner

Primary Examiner—Quochien B. Vuong
(74) Attorney, Agent, or Firm—Perman & Green, LLP (57) ABSTRACT

The invention concerns a method and associated hardware units for testing the functioning of downlink data communication in a mobile station (202, 802, 902). The mobile station is equipped for receiving (302, 805) a signal in the downlink direction and for sending (312, 808) a signal in the uplink direction. As a part of the method, a test signal (711, 715, 716, 805) is received in the downlink direction. The received test signal is compared (208, 713, 908) to a known form of the test signal. There is produced and temporarily stored (209, 806, 909) information about errors which were detected in the received test signal during the comparing step. In the uplink direction a signal is sent (714, 717, 808) representing the stored information about errors.

22 Claims, 6 Drawing Sheets

METHOD AND APPARATUS FOR MEASURING AND OPTIMISING THE QUALITY OF DATA TRANSMISSION

TECHNOLOGICAL FIELD

In general, the invention relates to arrangements for measuring and optimising the quality of data transmission in a digital cellular radio system. In its various embodiments, the invention relates to testing the functioning of a digital radio apparatus on the basis of error statistics as well as to combining such testing arrangements with the normal operation of a cellular radio system.

BACKGROUND OF THE INVENTION

Figure 1:
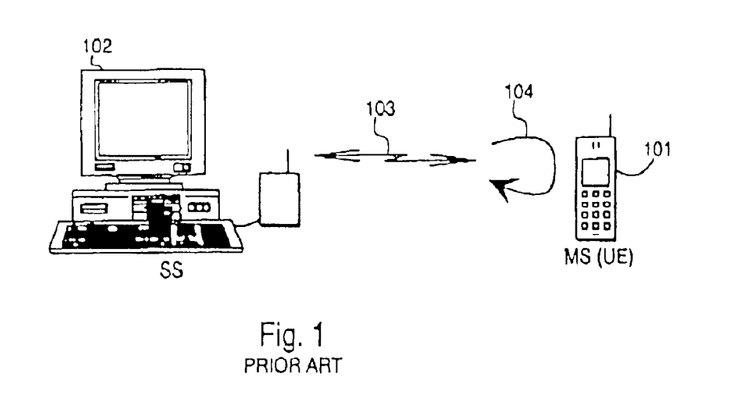
FIG. 1 illustrates testing according to the prior art.

New digital radio apparatus (digital mobile phones, for example) intended for operation in public data transmission networks are tested for type approval prior to being introduced into the market. Also newly manufactured units from a production line as well as repaired and/or serviced devices usually undergo certain testing. The equipment and methods used in the testing are usually defined in data transmission network standards. FIG. 1 illustrates a known test arrangement in which the apparatus to be tested is a mobile station (MS) 101 of a cellular radio system. The mobile station may also be called user equipment (UE). A simulation system (SS) 102 simulates a cellular radio system during the test. In this application such a system is called a simulation system or testing system. Testing the functioning of data transmission requires that an active data link 103 be setup between tie .SS and MS, which may be a radio link or a wire link through a testing interface at the mobile station.

Tests usually apply a technique in which a mobile station receives a downlink frame from the SS and sends back to the SS a corresponding uplink frame which contains an equivalent number of bits. The mobile station may even recycle to the SS the same individual bits that it received in the downlink direction, The SS examines whether the transmission or the operation of the mobile station caused errors in the flame. Arrow 104 depicts the loopback. The arrangement has been suitable for testing the mobile stations of known cellular radio systems since in the known systems the data transmission links are bidirectional and their capacity is distributed symmetrically: the capacities of uplink and downlink data transmission are equal. In mobile stations of new cellular radio systems, however, it is necessary to test functions that involve asymmetric distribution of data transmission capacity between uplink and downlink transmission. Moreover, mobile stations of new cellular radio systems may include functions based on unidirectional downlink data transmission the testing of which is naturally impossible using the method according to the prior art.

From an earlier Finnish patent application no. 981267 by the applicant, which is incorporated herein by reference, an alternative testing procedure is known which is suitable for the testing of data transmission arrangements with asymmetric capacities. In said procedure a mobile station selects from the bits of the downlink frame only a portion which is looped back to the uplink frames. The disadvantage of such an arrangement is that errors in those bits of the downlink frame that are not looped back uplink will remain undetected. In addition, this arrangement, too, is unsuitable for testing unidirectional downlink data transmission links.

Operators that are responsible for the operation of mobile phone networks and other cellular radio systems are extremely interested in the general quality of data transmission that the system can offer. Quality is an important factor in competition and often affects the decision-making when signing new subscriber contracts. The general quality of data transmission deals with factors such as the continuity of the coverage area (no dead spots nor areas with a very weak signal), the accessibility of channels (the network is not significantly jammed), as well as tolerance to several other simultaneous radio connections (simultaneous connections do not interfere with each other). A weak signal level and a high degree of interference cause bit errors in digital data transmission. The user notices the errors as difficulties in making and maintaining the connection, as well as in noise and interruptions therein. The technical reason for said symptoms is that the receiving apparatus must reject certain frames or protocol data units (PDUs), because they contain too many such incorrigible errors that cannot be accepted.

Known methods for measuring and optimising the general quality of data transmission require that a trained staff carries, within the system coverage area, particular measuring receivers, which produce location-bound measuring data of the various spots in the coverage area. In addition to the required personnel and equipment resources, another drawback of such arrangements is the fact that the data is rarely up to date. Both the operator of the system in question, as well as operators maintaining competing systems, continuously erect new base stations and adjust the transmission power of old base stations, which continuously changes the signal and interference conditions. The collecting and organising of the measurement data in a form that is suitable for practical network planning takes time and requires the setting up of special systems. In prior art telephone stations, it is possible to record statistical data as regards unsuccessfully established connections and quantities of established connections. In case of possible faults, there can also be recorded a fault code which roughly describes the nature of the disturbance. However, the fault statistic methods of the prior art are fairly approximate.

SUMMARY OF THE INVENTION

An object of the present invention is to provide a method for testing the functioning of a digital radio apparatus, which method is also suitable for testing the functioning of data communication arrangements which may have asymmetric capacities or may be unidirectional. Another object of the present invention is to provide a method for testing the operation of a digital data transmission apparatus, in which method the dependence on the correct internal functioning of the data transmission apparatus is lesser than in procedures according to prior art. Another object of the invention is to provide the equipment needed to implement the method according to the invention. A further object of the present invention is to introduce a method and arrangement whereby the general quality of data transmission in a cellular radio system can at least be measured, and most advantageously also optimised. A still further object of the invention is to shorten the delay between actual measurements and the moment when the results are available for use in network planning, A still further object of the invention is that the data so produced is fairly well up to date.

The objects of the invention are achieved by including in the digital radio apparatus tested a circuit that can produce a copy of the test data used in the test. Thereby, error statistics can be compiled at the digital radio apparatus tested so that only the statistical results need be transmitted uplink. The uplink connection can be entirely separate from the downlink connection.

The objects of the invention that relate to the measurement and optimization of general transmission quality of a cellular radio system are achieved by harnessing a number of portable mobile stations of the cellular radio system, or for instance all mobile stations, to collect such measurement data that describes the general quality of data transmission, and by arranging the process of collecting said data so that the locality dependency of said data is taken into account.

In the first aspect of the invention it concerns a method for testing the functioning of downlink data communication in a mobile station equipped for receiving a signal in the downlink direction and for sending a signal in the uplink direction; this aspect of the invention is characterized in that the method comprises the steps of:

receiving a test signal in the downlink direction, comparing the received test signal to a known form of the test signal producing and temporarily storing information about errors which were detected in the received test signal during the comparing step, and sending in the uplink direction a signal representing the stored information about errors.

In the second aspect of the invention it concerns a method for testing the functioning of data communication in a communication connection between a device equipped for sending a signal in the downlink direction and for receiving a signal in the uplink direction and a mobile station equipped for receiving a signal in the downlink direction and for sending a signal in die uplink direction; this aspect of the invention is characterized in that it comprises steps of:

generating a first test sequence, generating known errors in the first test sequence to produce a second test sequence, sending the second test sequence in the downlink direction to the mobile station, producing at the mobile station a third test sequence corresponding to the first test sequence, comparing at the mobile station the second test sequence to tile third test sequence in order to detect differences between the second and third test sequences, and sending in the uplink direction from the mobile station information representing the differences detected between the second and third test sequences.

In the third aspect of the invention it concerns a method for testing the functioning of downlink data communication in a cellular radio system; this aspect of the invention is characterized in that it comprises the steps of:

sending a test signal from a base station to at least one mobile station, receiving the test signal sent by the base station at a mobile station, comparing the test signal received at the mobile station to a known form of the test signal, producing and temporarily storing at the mobile station information about errors which were detected in the received test signal during the comparing step, sending information representing the stored information about errors from the mobile station to a base station, receiving the information sent by the mobile station at a base station, and storing in the cellular radio system the information received by the base station.

In the fourth aspect of the invention it concerns a mobile station of a cellular radio system, comprising:

reception means for receiving a signal in the downlink direction and transmission means for sending a signal in the uplink direction; this aspect of the invention is characterized in that it comprises comparison means for comparing a received test signal to a known form of the test signal, means for producing and temporarily storing information about errors which were detected in the received test signal by said comparison means and uplink sending means for sending in the uplink direction a signal representing the stored information about errors.

In the fifth aspect of the invention it concerns a system for measuring the general quality of data transmission in a cellular radio system, said system comprising a base station subsystem and a mobile station; this aspect of the invention is characterized in that it comprises in the base station subsystem, means for generating a test signal and for transmitting it via a base station of the cellular radio system to the mobile station of the cellular radio system, in the mobile station, means for generating and storing data describing the occurrence of errors in the test signal received by the mobile station, in the mobile station means for transmitting a first error message to the base station subsystem, said first error message describing the occurrence of errors in the test signal received by the mobile station within a given slot and a control unit for collecting such error data that describes the error messages received by tile base station subsystem of the cellular radio system from the mobile stations.

The measuring of bit error ratio (BER) and frame erasure ratio (FER), as well as the building up of statistics, is known as such. For instance the testing carried out in connection with the production and type approval steps of mobile phones has traditionally included a step where the testing equipment transmits in the downlink direction test data to the mobile station, which test data is then circulated by the mobile station either completely or partly back in the uplink direction. In known arrangements the testing equipment detects how many errors have been introduced into the test data on its path through the mobile station to be tested, and builds up statistics of the error occurrences, The type approval conditions set certain limits which the error occurrences must not exceed.

In accordance with a first aspect of the invention a circuit is included in a digital radio apparatus which is capable of producing the same test sequence as the simulation system, or more generally, the device from which the test sequence originates. Thus for example a mobile station receiving downlink test data knows bit by bit what the received test data frames should contain. By comparing the received bit sequence to the sequence it has produced itself it can detect errors in the received sequence and compile various error statistics in the form of bit error ratio (BER) or frame erasure ratio (FER), for example, The uplink connection is only needed to convey these statistics to the simulation system or other party communicating with the mobile station, so that at best the need for uplink data transmission capacity is only a fraction of that needed for downlink data transmission. In general it can be said that the digital radio apparatus performs an error analysis of the received bit sequence using a bit sequence produced by the digital radio apparatus itself and transmits in the uplink direction information about the results obtained from the analysis.

The uplink data connection need not be conceptually associated with the downlink data connection at all. If the uplink data connection is only needed locally as e.g. between a piece of test equipment and a tested mobile station, the uplink connection may rely on the so-called Bluetooth link which has been proposed for new electronic apparatus to provide a short-range wireless data link between at least two apparatus. A mobile station can send information about the analysis results to the test equipment via the Bluetooth link.

In order to take even more advantage of the ability of the digital radio apparatus to produce a copy of what it assumes to be the correct test sequence, it is possible to intentionally introduce a known number of errors into the test sequence. The test sequence is sent to the digital radio apparatus preferably under good enough signal propagation conditions so that it is unlikely that the quantity or quality of errors would substantially change prior to that point in the digital radio apparatus tested where the correctness of the received sequence is analyzed. When the tested apparatus compares the received test sequence to the sequence it has produced itself it detects the errors in the received sequence and produces various error statistics in the form of bit error ratio (BER) or frame erasure ratio (FER), for example. The uplink connection is used to convey these statistics to e.g. a simulation system or some other device which examines whether the information provided by the tested apparatus matches the original information about the intentionally caused erroneousness of the sequence sent in the downlink direction.

When the invention is applied to the task of measuring and optimizing the general data transmission quality of a cellular radio system, the measuring of the bit and/or frame error ratio as well as the building up of error statistics are applied so that a number of base stations (or for example all base stations) transmit a given signal, which in the sense meant by the invention can be interpreted as, a test signal. A number of mobile stations is programmed to receive the test signal and to measure and register the errors occurring in the received test signal and to compile statistics thereof. The mobile stations transmit the registered error data, or some parameters describing it, or the compiled statistics, or some parameters describing the compiled statistics, to the base stations, wherefrom they are transmitted in the cellular radio system further to a given central station. The error data is associated with a piece of locality information, which in its simplest form is the same as the location area defined in the cellular radio system, but which also can be a detailed piece of information of the location of the mobile station at the point of measurement. It has often been suggested that the mobile stations of future cellular radio systems should be provided with a device not unlike the current global positioning system (GPS), whereby the location of the mobile station can at any moment be defined extremely accurately. There have likewise been suggested methods and arrangements in order to enable the mobile station to find out its own location, for example by means of the time differences between the signals transmitted by certain base stations, or by some other means. In similar fashion, there have been suggested methods and arrangements in order to enable the network to find out the location of the mobile station, for instance by observing the messages transmitted by the mobile station via several base stations. Such arrangements for defining locations can also be utilised in the system according to the present invention.

The test signal transmitted by the base station can be combined with the normal transmission activity of the base station, in which case for instance part of the general messages transmitted in the so-called broadcast channel are understood as test signals. Such messages are generally transmitted in frames including a cyclic redundancy check (CRC) code or some other error detection code. Thereby the mobile station can find out whether the received general frame contains errors. There can, however, also be introduced an embodiment where the base stations or some of them are programmed to transmit a given pseudorandom bit sequence, which is generated by initialising a given random number generator with a given seed number. All mobile stations, or some of them, can be provided with a corresponding random number generator, in which case the base station and the mobile station can use the same seed number in order to generate the same pseudorandom bit sequence both in the base station and in the mobile station. When the mobile station has received the pseudorandom bit sequence transmitted by the base station, it compares it with a corresponding self-generated sequence and calculates and registers the errors occurring in the received signal.

The functionality of the above described measuring arrangement can be tested so that at least one base station transmits from time to time a test signal which is on purpose provided with a known number of errors. The mobile station does not know that the errors are caused on purpose already prior to transmitting the test signal, but it treats them in similar fashion as other detected errors. After said errors are detected and registered in the mobile station, and after the mobile station has transmitted the related error data to the base station, the number of known errors can be compared to the error data given by the mobile station. Contradictions between these two sets of data mean that the system may not function in the desired way.

BRIEF DESCRIPTION OF DRAWINGS

The invention is explained in more detail below, with respect to the preferred embodiments described by way of example and to the appended drawings, where

FIG. 1 was described earlier within the description of prior art, so the following description of the invention and its advantageous embodiments focuses on FIGS. 2 to 10. Like parts in the drawings are designated with the same reference designators.

DETAILED DESCRIPTION OF THE INVENTION

Figure 2:
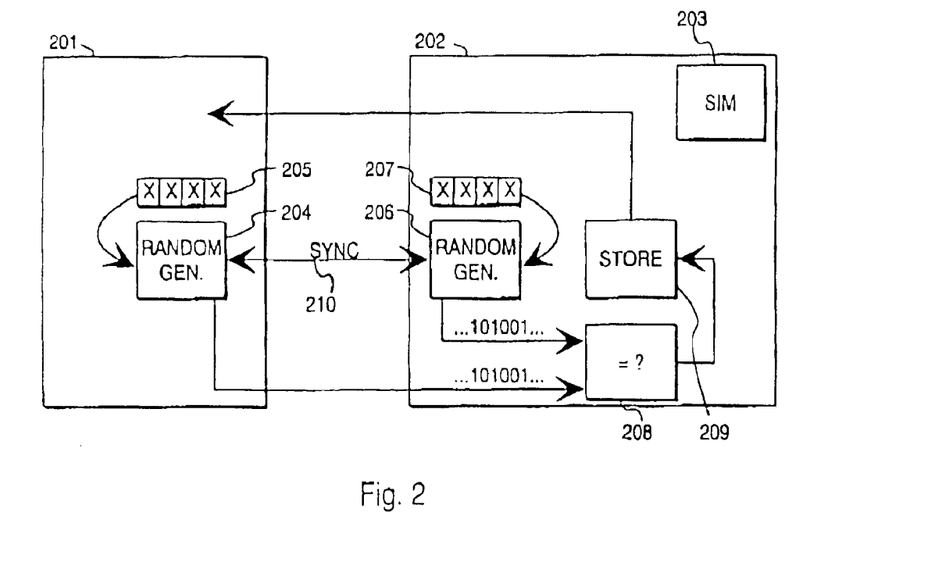
FIG. 2 illustrates the principle of an embodiment of the invention.

FIG. 2 shows an arrangement in which a mobile station 202 to be tested is coupled in a known manner to test equipment 201. It is usually advantageous from the testing standpoint that the mobile station 202 is equipped with a subscriber identity module (SIM) 203 designed specifically for testing purposes, which SIM may be a smart card like the SIM card widely used in mobile stations or a special SIM simulator which establishes the necessary connections between the SIM interface in the mobile station and a special equipment simulating the operation of a SIM. However, the invention does not require the use of a particular SIM.

In a known manner the test equipment 201 comprises a bit sequence generator 204 which is initialized using a certain so-called seed 205 and which then produces a pseudorandom bit sequence. In accordance with the invention the mobile station comprises a functionally identical bit sequence generator 206 which also is initialized using a certain seed 207. It follows from the general principles applying to pseudorandom bit sequence generators that if the seeds 205 and 207 are identical, generators 204 and 206 will produce exactly identical pseudorandom bit sequences. The use of just pseudorandom bit sequences for testing has been found to contain certain advantages, because the pseudorandom nature of them models reasonably well a practical communication situation where it can not be predicted, what exactly will be transmitted over a communication connection. Constant or systematically changing bit sequences could be used as well, but they usually do not exhibit the same advantageous characteristics from the testing point of view.

In accordance with the invention tie mobile station 202 also comprises a comparator circuit 208 and a statistical analysis and storage unit 209 which are adapted so as to compare bit by bit the bit sequence received from the test equipment to the locally produced bit sequence and to compile and temporarily store statistics of the differences detected. In addition, there is an uplink connection from the statistical analysis and storage unit 209 back to the test equipment so that the resulting statistics can be sent to the test equipment. This connection may be an uplink channel in the same data connection via which the downlink signal was sent from the test equipment 201 to the mobile station 202 or it may be some other connection such as a Bluetooth connection For the comparison of pseudorandom bit sequences to be meaningful, the bit sequence generators 204 and 206 must operate in a synchronized manner, i.e. they have to generate the same bits at the same pace. The synchronization of the generation of bit sequences is known per se because in spread spectrum technology in general and specifically in code division multiple access (CDMA) methods the differentiation of a given utility signal from rivaling signals and noise is based on using one and the same pseudorandom spreading sequence at both the transmitting and receiving end. In connection with the invention it is possible to use a known technique to synchronize the generation of the bit sequences. In FIG. 2, synchronization is schematically depicted by an arrow 210.

Through the uplink connection it is possible to send e.g. a stored bit error ratio or frame erasure ratio value or a value derived from them, such as a mean bit error ratio over a time span. Many applications are only interested in whether the bit error ratio or frame erasure ratio stays below a predetermined limit, in which case only a yes/no type answer (is smaller than limit value/is not smaller than limit value) needs to be sent uplink. Since limit values are usually defined as exponential numbers (say, $1.0 \cdot 10^{-6}$), one possibility is to sent uplink the exponent x of the number $1.0 \cdot 10^{-x}$ which represents die upper limit value of the observed bit error ratio. Thus e.g. a number −6 sent uplink would indicate that the observed bit error ratio is smaller than $1.0 \cdot 10^{-6}$.

Figure 3:
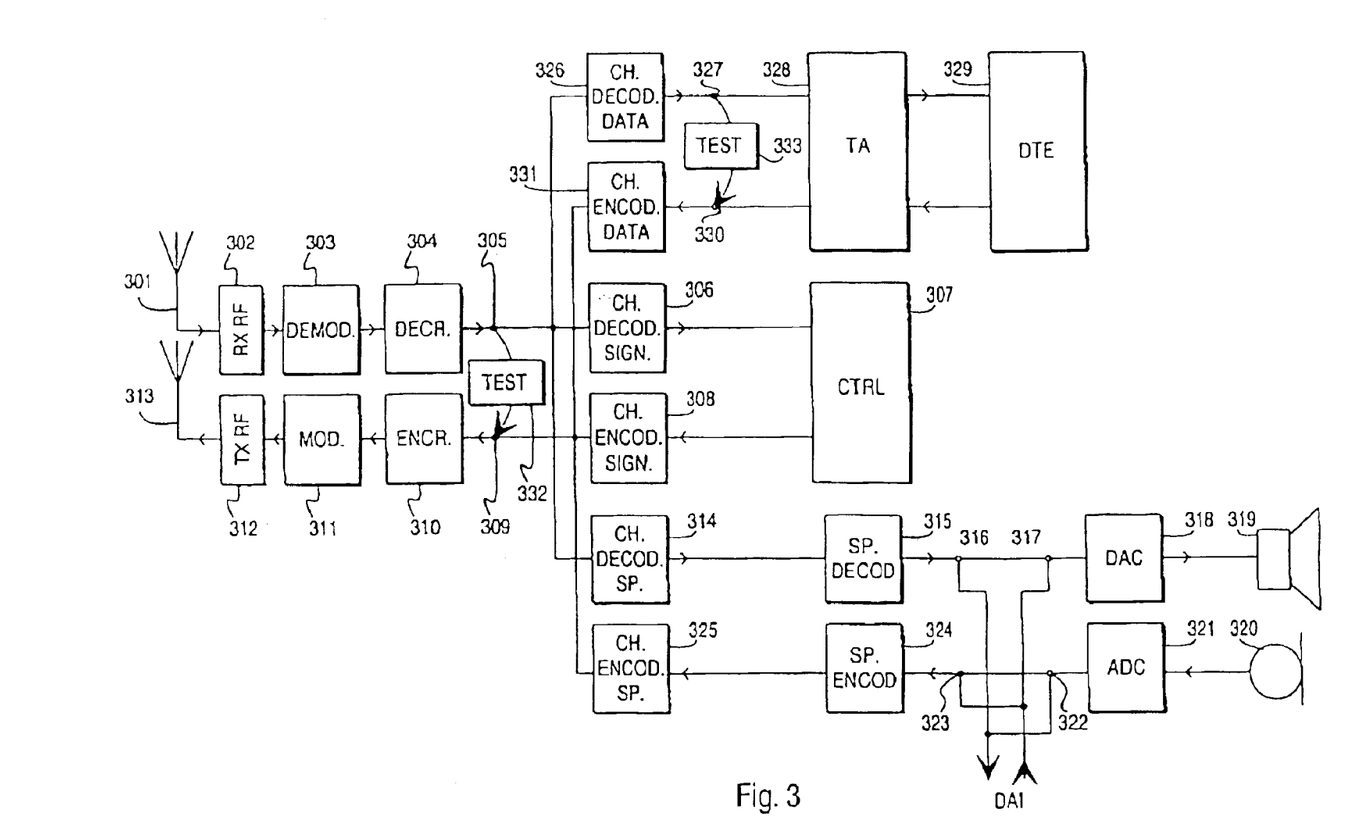
FIG. 3 is a block diagram of a mobile telephone according to an embodiment of the invention.

FIG. 3 is a block diagram of a mobile station where the invention can be applied. The mobile station illustrated in the drawing is a mobile phone provided with data channels, but the applicability of the invention is by no means restricted to mobile phones only. The interface 301 is an antenna interface through which the downlink radio frames come to the mobile phone; it can be an antenna proper or some other RF interface provided in the mobile phone for testing and/or other purposes such as coupling to an external antenna in a vehicle installation kit Block 302 illustrates in general all such known radio and intermediate frequency elements through the operation of which the received radio-frequency signal is downconverted onto baseband frequencies. The information contained by a baseband signal is reconstructed in a demodulator 303, and a possible encryption is decoded in a decoding block 304. From this point onwards, the processing of the received information differs according to whether it is signalling, digitised speech or data.

The information contained by the signalling channels is conducted to a channel decoder 306, and therethrough to a control block 307, which is a microprocessor and controls the operation of the mobile phone. The data contained in the uplink signalling channels is generated in the control block 307, and it is channel coded in block 308. From the point 309 onwards, the channel coded uplink signalling information is treated in same fashion as any other uplink information, i.e. it is encrypted in an encryption block 310, added, by means of modulation, to baseband oscillations in the modulator 311 and upconverted onto radio frequency in the general block 312 describing the radio frequency parts of the transmission branch in question, whereafter it can be transmitted via an antenna interface 313. The antenna interfaces 301 and 313 can be one and the same antenna interface, in case the mixing of the uplink and downlink information is prevented by means of a suitable duplexing block (not illustrated).

Downlink digitised speech is conducted at point 305 to a channel decoder 314 of the speech channels, and the signal generated by said decoder is further subjected to speech encoding in block 315. Points 316 and 317 form part of a so-called digital audio interface (DAI), via which the digital speech information processed by the mobile station can be monitored from outside the mobile station. If the DAI interface is passed over, from the speech encoder 315 there is provided a direct connection to the D/A converter 318, and the speech information converted to analog form by said converter can be repeated by a loudspeaker 319. In the uplink direction, a microphone 320 records speech which is then digitised in an A/D converter 321, and which can thereafter be conducted, via the DAI interface to an external measuring device; this part of the DAI interface is represented by points 322 and 323. From block 321, digitised speech can also be conducted directly to a speech encoder 324 and further to the channel encoder 325 of the speech channels, and further to point 309, wherefrom its treatment proceeds as is illustrated above, as regards the signalling information in the uplink direction.

From point 305, the downlink information belonging to the data channels is conducted to the channel decoder 326 of the data channels. When the mobile phone is used together with an external data station, the channel decoded information connected to the data channels is conducted, via point 327, to a station adapter 328 and further to an external station 329. Respectively, uplink information connected to the data channels is conducted, from the data station 329 via the mobile station adapter 328 and point 330, to a data channel encoder 331, and the processing of the channel encoded data proceeds from point 309 towards the antenna interface 313 in similar fashion as was described above, as regards the uplink signalling information.

In practice, the blocks illustrated in FIG. 3 are not necessarily separate in a mobile phone, but for instance the channel encoding and decoding blocks 306, 308, 314, 325, 326 and 331 can be realised by means of one circuit, which is programmed to function in different ways depending on whether it deals with signalling, speech or data. However, it is quite normal to treat the blocks illustrated in FIG. 3 as separate blocks, because it helps to get an overall view of the operation of the mobile phone.

The comparison according to the invention of the received pseudorandom bit sequence with a locally generated bit sequence can be carried out at many points of FIG. 3. In one embodiment, the comparison and the composing of error statistics is carried out at point 305, and the obtained results are conducted to uplink data transmission at point 309 according to block 332. In another embodiment, where particularly the operation of the data channels is tested, the comparison and the error statistics registration is carried out at point 327, and the registration results are connected to uplink data transmission at point 330, according to block 333. Similar test loops, as in the latter case, can also be formed in other than data channels. The operation according to said embodiments requires certain separate arrangements; particularly that the mobile station is provided to form said test loops. It is also possible to realise the comparison and the error statistics registration after channel decoding, in the control block 307.

In FIG. 3, it is assumed that uplink data is transmitted via a given uplink data transmission channel, in which case blocks 332 and 333 form a test loop in between the downlink and the uplink data transmission. If a Bluetooth connection or a corresponding separate data link is used to transmit the uplink information, blocks 332 and 333 must have a connection to the functional block (not shown) that maintains such a separate transmission link.

The comparison and error statistics composing processes are switched on according to a given measuring timetable or by given commands that the mobile station receives in the downlink direction. In order to illustrate the background and processing of these commands it will be next described briefly a portion of a cellular radio system protocol stack defined in the specifications of the cellular radio system in question, referring to FIG. 4. The architecture described relates to the so-called Layer 3 protocol signaling in the GSM system, as defined in specification ETS GSM 04.07, although some insignificant simplifications have been made in the figure for the reason of graphic clarity.

Figure 4:
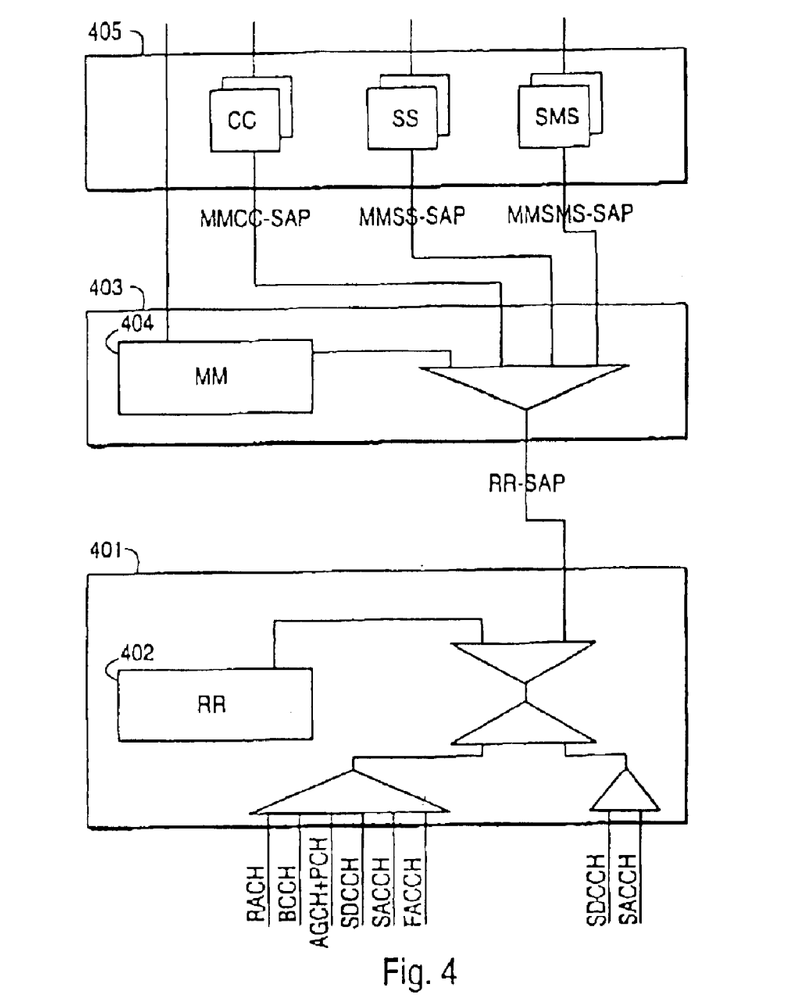
FIG. 4 illustrates the architecture of a protocol level in a data transmission protocol.

The bottom protocol layer 401 in FIG. 4 is a so-called radio resource (RR) management layer which has links downward through several separate logical channels. These channels are the random access channel (RACH), broadcast control channel (BCCH), access grant channel/paging channel (AGCH+PCH), standalone dedicated control channel (SDCCH), fast associated control channel (FACCH) and the slow associated control channel (SACCH). Channels related to radio resource management are connected to an RR block 402, and other channels are connected via the RR service access point (RR-SAP) to the next higher protocol layer, which is the mobility management (MM) layer 403. On that layer, channels related to mobility management are connected to an MM block 404, and other channels are directed via SAPs of their own to layer 405: the connection related to call control is directed via MMCC-SAP to the call control (CC) part of layer 405, the connection related to supplementary services is directed via MMSS-SAP to the supplementary services (SS) part of layer 405, and the connection related to short messages is directed via MMSMS-SAP to the short message services (SMS) part of layer 405. The CC, SS and SMS parts of layer 405 and the MM block of layer 403 have connections to the next higher protocol layer, which is not shown in FIG. 4.

We may consider the applicability of the protocol structures shown in FIG. 4 to a testing embodiment of the invention where a mobile station is communicating with a piece of test equipment. At the beginning of the test an arrangement according to FIG. 2 is first set up in which the mobile station to be tested is connected in a known manner to the test equipment and test SIM. A mobile terminating (MT) radio link is established between the mobile station and test equipment in accordance with FIG. 5. When the mobile station is on, the test equipment sends to it on tile PCH a paging request 501, to which the mobile station responds with a channel request 502 sent on the RACH. After that, the test equipment sends an immediate assignment 503 which may include various instructions for the mobile station. The mobile station sends to the test equipment a set asynchronous balanced mode (SABM) message 504 which in fact is a paging response and is sent on the SDCCH. The test equipment acknowledges the SABM message using an unnumbered acknowledge (UA) 505.

Figure 5:
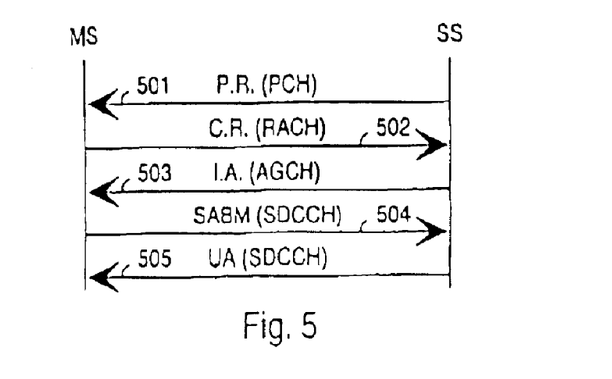
FIG. 5 illustrates a method of using the embodiment of FIG. 2 in testing.

The contents and syntax of the messages shown in FIG. 5 are mainly defined in specification GSM 04.08. However, some messages have portions reserved for future extensions, which portions can be used to utilize the messages for the present invention. Particularly the immediate assignment 503 contains so-called rest octets in which the first two bits indicate the contents of the rest of the rest octet. By the priority date of this patent application values 11 and 10 of the values of the first two bits of the rest octet have been reserved but values 01 and 00 are unused. In accordance with a preferred embodiment of the invention at least one of these values can be reserved to indicate that in response to the immediate assignment 503 the mobile station to be tested has to set itself in a special test mode. The test mode is advantageously defined such that even though an RR-level link between the mobile station and test equipment has already been established, the RR layer (layer 401 in FIG. 4) in the mobile station's protocol stack will not inform the MM layer (layer 403 in FIG. 4) about the link. As the MM layer and higher protocol layers do not know about the existence of the radio link, they will not try to disconnect the link because of a supervising mechanism which would e,g. attempt to monitor the error status of the connection.

So test mode means that the mobile station to be tested is instructed to maintain a connection on a certain transmission channel. The mobile station is kept in the test mode by Layer 3 signaling. Defining the test mode as described above and realization of the definition in practice can be easily implemented by a person skilled in the art since the operation of the mobile station is totally controlled by its control block (reference designator 307 in FIG. 3). The control block in turn is a micro-processor which executes a program stored in the memory media available to it When this program is written such that in response to the reception of a certain Layer 3 command no notification is sent to upper protocol layers, the mobile station can be made to function in the desired manner according to the invention.

When connection has been established in the manner according to FIG. 5 the test equipment can send to the mobile station to be tested any commands that do not require that upper protocol layers, which do not know about the connection, participate pate in the communication. Below a case is described in which the test equipment wants the mobile station to make comparisons and error statistics in accordance with block 332 between points 305 and 309, referring to FIG. 3. For simplicity, this arrangement can be called a G loop. By way of example, let us especially consider a case in which the transmission channel tested is a HSCSD-type data channel, or such that data belonging to it can be placed in more than one timeslot in a radio frame. Such a channel may also be called a multislot channel.

At first the test equipment sends a comparison and statistical operation start command associated with the data channel, which command can be called CLOSE_Multi-slot_loop_CMD. The close command may include an identifier on the basis of which the mobile station identifies the G loop. Alternatively, it may be specified that if the CLOSE_Multi-slot_loop_CMD does not include an identifier, it refers to the closing of the G loop. For the test equipment to be able to verify that a message sent by it has been received it advantageously starts a timer in connection with the sending, in which case the mobile station must send an acknowledge before the timer expires. The mobile station acknowledges the message using an acknowledge message which can be called CLOSE_Multi-slot_loop_ACK. The mobile station closes, i.e. activates, the test loop in a certain time after it has sent the acknowledge. Compatibility with certain earlier specified functions may require a certain value for that time period. In GSM, an advantageous value is one so-called-reporting period, or block length on SACCH, which corresponds to the length of 104 radio frames. In addition, it is advantageous to specify that if the test loop is already closed or the active radio link has not been established in the manner according to FIG. 5, the mobile station will not respond to the CLOSE_Multi-slot_loop_CMD message.

Once the G loop has been activated the test equipment can start sending test data, i.e. periods of a pseudorandom bit sequence packed in downlink frames. In an alternative embodiment the information bits in the downlink frames may also include non-random bit combinations which will be particularly examined for reception errors. Naturally the mobile station tested must know about the use of such bit combinations just as it knows about the use of the pseudo-random bit sequences as described above. Functionally, the transmission and reception of data are implemented at the physical protocol level which is called Layer 1. So, in principle the testing need not involve any one of the higher protocol levels at the mobile station. However, Layer 1 does not allow for any commands relating to the control of the operation of the mobile station but the reception and interpretation of such commands require activity at Layer 3. However, in accordance with a preferred embodiment of the invention, no notification is sent to the upper protocol levels although normal operation would require that the information about the active communications link be sent to all protocol levels up to the application level to the operation of which the data transmitted via the link are related. Naturally the invention does not exclude that another embodiment of the invention conform to the normal procedure as regards the protocol levels.

While the G loop is active the mobile station compares the received bit sequence portions to the locally produced portions and measures e.g. the bit error ratio or frame erasure ratio and compiles statistics of the measurement results in a desired manner. Since the received signal is examined in the G loop prior to channel decoding, the locally produced bit sequence at the mobile station also has to be channel encoded for the comparison to be meaningful. Complete statistics or information elements representing the reception error status in general are sent uplink to the test equipment.

The test equipment receives the uplink frames sent by the mobile station and demodulates and decrypts them so that the statistical results in the received frame can be processed by the test equipment. The signal level at which the downlink frames are delivered to the mobile station can be varied so that the bit error ratio (BER) detected by it represents the sensitivity of the receiver of the mobile station especially at low signal levels. It is typical of type approval tests that a certain minimum sensitivity is required of the mobile station, which means that at a given signal level the bit error ratio must not exceed a predetermined limit value.

At the end of the test the test equipment may instruct the mobile station to release the test loop by sending a special command which can be called OPEN_Multi-slot_loop_CMD. The command need not identify which particular test loop is meant if it has been specified that the mobile station can only have one active test loop at a time. The mobile station opens the test loop and acknowledges the message with an acknowledge message which can be called OPEN_Multi-slot_loop_ACK. In connection with the release of the test loop the mobile station returns from the test mode to the normal operating mode.

Let us next consider a case in which the test equipment wants the mobile station to make comparisons and error statistics according to block 333 between points 327 and 330, referring to FIG. 3. For simplicity, this test loop can be called an H loop. Let us consider a case in which a HSCSD-type data channel is to be tested. The test equipment sends a CLOSE_Multi-slot_loop_CMD which now advantageously includes an identifier on the basis of which the mobile station identifies the H loop. If there can be several different data channels, the data channel in question has to be identified, too. Again, the test equipment advantageously starts a timer in connection with the sending of the message, in which case the mobile station has to send an acknowledge before the timer expires. The mobile station acknowledges the message using a CLOSE_Multi-slot_loop_ACK whereby the test equipment stops said timer. The mobile station activates the test loop in a certain time after it has sent the acknowledge. This time period is preferably the same as in the G loop case described above.

Operation according to the B loop differs from that according to the G loop in that since channel decoding is realized before the data are sent back uplink, the mobile station can also examine whether the received data frames have errors that are revealed by checksums included in the data frames. So, in addition to or instead of the normal error detection and statistical method it is also possible to use a second method. Moreover, the bit sequence produced locally at the mobile station needn't be channel encoded now.

In GSM it is also possible that the mobile station detects in association with decoding, on the basis of the values of the stealing flags, that the frame contains data related to the FACCH channel. The invention does not limit die handling of such frames in a test situation. An advantageous solution is to let both the uplink and downlink FACCH operate normally in a test situation, specifying no test response for the reception of a frame belonging to the downlink FACCH. The same applies to the SACCH channel. Opening of the H loop is carried out in the same way as opening of the G loop described above.

The following general rules apply preferably to all test loops described above:
- one OPEN_Multi-slot_loop_CMD message shall open all active test loops,
- assignment to a new multislot channel timeslot configuration shall be preceded by an OPEN_Multi-slot_loop_CMD message to open existing test loops,
- it is the responsibility of the test equipment to ensure correct channel configuration for the test,
- termination of an established data link shall open the test loops in the same way as an OPEN_Multi-slot_loop_CMD message,
- changing the transmission power, a new channel assignment or a handover shall not affect the test loops,
- the test equipment shall make sure that a new channel assignment, handover or re-configuration will not include a timeslot configuration that would affect the test loop,
- once the test loop is closed, a new CLOSE_Multi-slot_loop_CMD message shall override the previous one (multiple CLOSE_Multi-slot_loop_CMD messages are not additive),
- if the data link is terminated and the test loops are therefore opened, there is no need to send a separate OPEN_Multi-slot_loop_CMD message,
- a data channel test loop affects only the data channel in question, not e.g. the operation of FACCH or SACCH channels, and
- data channel test loops have no effect on the operation of possible other simultaneous test loops nor are dependent of them.

Figure 6:
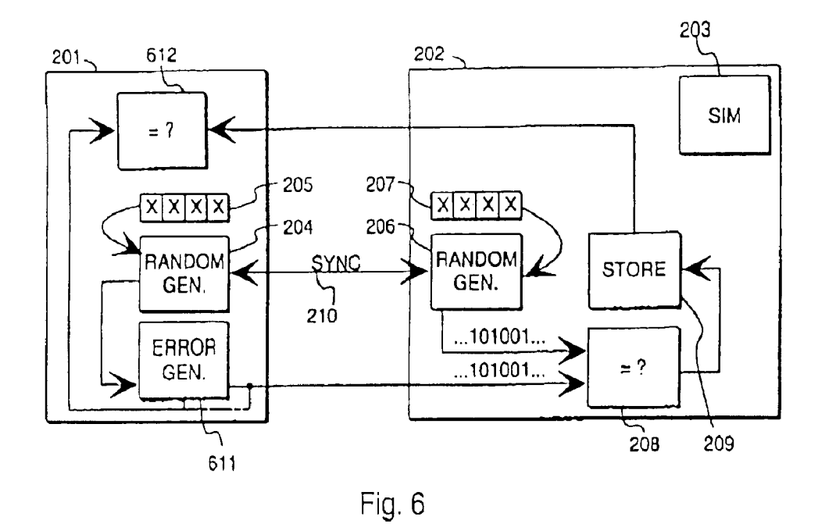
FIG. 6 illustrates the principle of another embodiment of the invention.

Next we will consider the possibility of intentionally introducing errors into the test sequence. FIG. 6 illustrates an arrangement otherwise similar to that of FIG. 2 but with the difference that the test equipment includes an error generator 611 operating in a controlled manner such that it can produce a certain known erroneousness in any given test sequence. The error generator 611 can produce errors in a test sequence partly pseudorandomly, i.e. in such a manner that a given portion of the test sequence has an exact known number of errors but their placement within that portion is random. The error generator 611 may also operate in such a manner that it produces an exact specified bit error pattern which e.g. has at K-bit intervals a period of N bits, where the value of every $M^{th}$ bit is changed. Here, K, N and M are positive integers, whereby the control circuit (not shown) controlling the operation of the error generator can accurately control the generation of errors by providing the error generator with the desired K, N and M values. Many combinations and modifications of these techniques are also possible.

In accordance with the invention the test equipment also includes a comparison circuit 612 which is informed about how many and what kind of errors the test sequence includes at the moment of sending to the mobile station in downlink data transmission frames. This information may come from the error generator control data, as depicted in FIG. 6 by a continuous line, or the comparison circuit 612 may receive copies of the downlink frames delivered to the mobile station tested. The latter option is depicted in FIG. 6 by a broken line. When the mobile station tested sends to the test equipment the information about the detected errors, the information is directed to the comparison circuit 612 in the test equipment The comparison circuit 612 can then examine whether the information from the mobile station tested matches the information representing die erroneousness of the test sequence at the moment of sending.

The procedures of setting up, using and tearing down test loops in the mobile station to be tested may operate exactly as described above in association with the embodiment where intentional errors in the test sequence were not utilized. Especially the test loop may again be closed without contribution from certain upper protocol layers.

Figure 7:
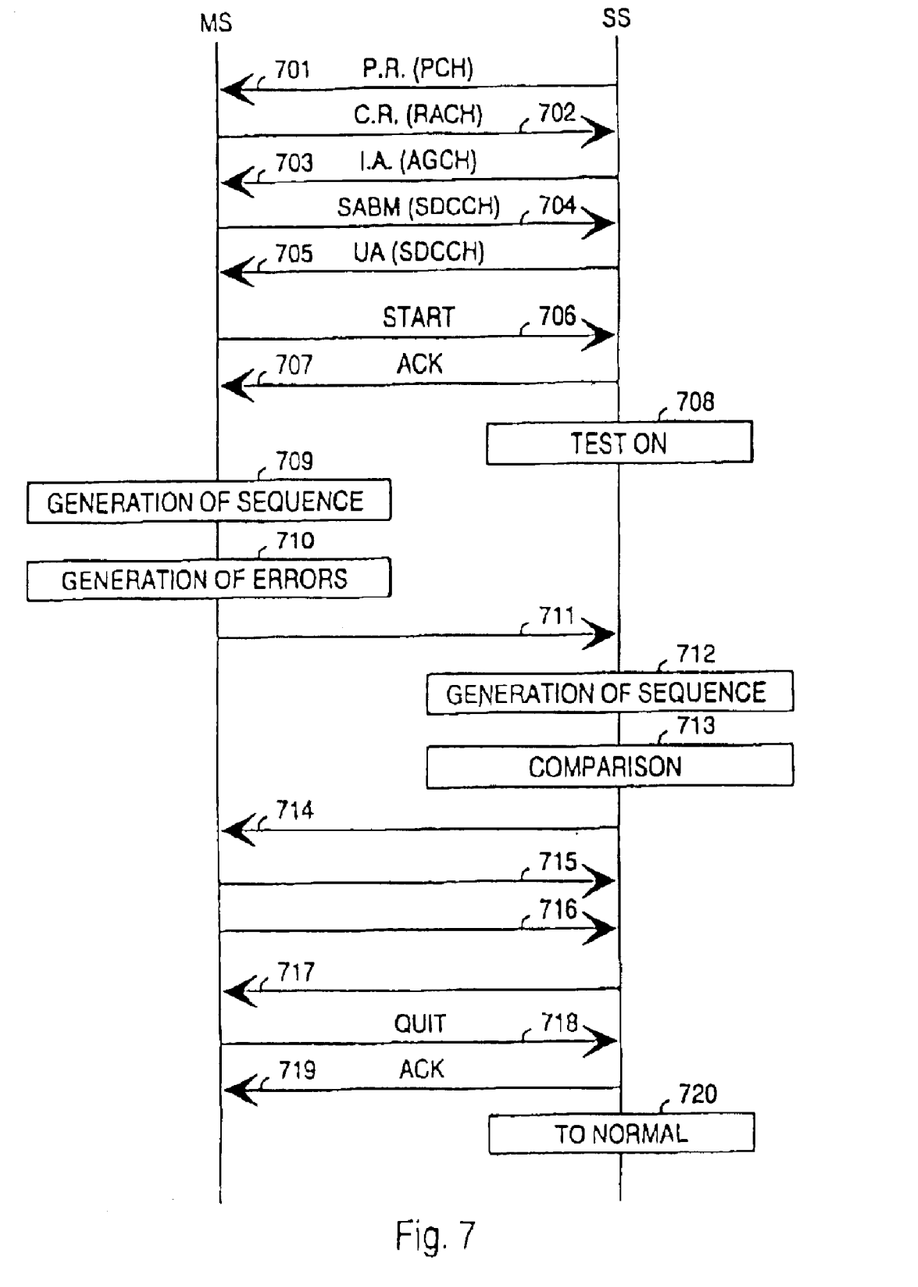
FIG. 7 illustrates a method of using the embodiment of FIG. 6 in testing.

FIG. 7 shows an exemplary testing method where intentional errors in the test sequence are utilized. The mobile station tested is connected in a known manner to the test equipment and test SIM. A mobile terminating (MT) radio link is established between the mobile station and test equipment in accordance with FIG. 7. When the mobile station is on, the test equipment sends to it on a PCH channel a paging request 701, to which the mobile station responds with a channel request 702 sent on a RACH channel. After that, the test equipment sends an immediate assignment 703 which may include various instructions for the mobile station. The mobile station sends to the test equipment a set asynchronous balanced mode (SABM) message 704 which in fact is a paging response and is sent on a SDCCH channel. The test equipment acknowledges the SABM message using an unnumbered acknowledge (UA) 705.

The contents and syntax of the messages shown in FIG. 7 are mainly defined in specification GSM 04.08. However, some messages have portions reserved for future extensions, which portions can be used to utilize the messages for the present invention. Particularly the immediate assignment 703 contains so-called rest octets in which the first two bits indicate the contents of the rest of the rest octet. By the priority date of this patent application, values 11 and 10 of the values of the first two bits of the rest octet have been reserved but values 01 and 00 are unused. In accordance with a preferred embodiment of the invention at least one of these values can be reserved to indicate that in response to the immediate assignment 703 the mobile station to be tested has to set itself in a special test mode. The test mode is advantageously defined such that even though an RR-level link between the mobile station and test equipment has already been established, the RR layer in the mobile station's protocol stack will not inform the upper MM layer about the link. As the MM layer and higher protocol layers do not know about the existence of the radio link, they will not try to disconnect the link because of a supervising mechanism which would e.g. attempt to monitor the error status of the connection.

So test mode means that the mobile station to be tested is instructed to maintain a connection on a certain transmission channel. The mobile station is kept in the test mode by Layer 3 signaling. Defining the test mode as described above and realization of the definition in practice can be easily implemented by a person skilled in the art since the operation of the mobile station is totally controlled by its control block. The control block in turn is a microprocessor which executes a program stored in the memory means available to it. When this program is written such that in response to the reception of a certain Layer 3 command no notification is sent to upper protocol layers, the mobile station can be made to function in the desired manner according to the invention.

When a connection has been established, the test equipment can send to the mobile station tested any commands that do not require that upper protocol layers, which do not know about the connection, participate in the communication. Below it is simply assumed that the test equipment sends a start comparison and processing command START 706 which may include various identifiers, e.g. to specify the point in the mobile station tested at which the statistical processing of errors should be cared out. For the test equipment to be able to verify that a message sent by it has been received it advantageously starts a timer in connection with the sending, in which case the mobile station must send an acknowledge before the timer expires. The mobile station acknowledges the message using an acknowledge message ACK 707. The mobile station activates 708 the test loop in a certain time after sending the acknowledgement, When the test loop is activated at the mobile station tested, the test equipment can start to send test data, i.e. blocks of a pseudorandom test sequence packed into downlink frames such that errors are generated in said blocks in a known manner. To that end, the test equipment produces 709 a first test sequence, generates 710 known errors in it, and sends 711 the resulting second test sequence to the mobile station tested. The mobile station tested produces 712 a third test sequence corresponding to the first test sequence and compares 713 the second test sequence to the third test sequence in order to detect the differences between the test sequences. The mobile station tested responds to the test equipment by sending to it information that represents errors detected in the received signal. This is depicted by an arrow 714 in FIG. 7. As the purpose is to test the detection of errors at the mobile station, the test data is advantageously sent to the mobile station at a relatively high signal strength and under optimal signal propagation conditions so that no errors are likely to be generated in the test data during the transmission.

Arrows 715 and 716 depict the sending of test data at different "error levels". Errors can be generated in the test data e.g. in greater or smaller quantities, or the errors may follow various occurrence patterns (regularly/irregularly, evenly/burstily etc.). The invention does not limit the actual placement of errors in tie test data. Arrow 717 depicts the retransmission by the mobile station tested of information representing the errors detected in the received signal.

When the test loop is active the mobile station compares the received test sequence blocks to the locally produced blocks and measures e.g. the bit error ratio or frame erasure ratio and compiles statistics of the measurement results in a desired manner. Complete statistics or information elements representing the reception error status in general are sent back uplink to the test equipment. The test equipment receives the uplink frames sent by the mobile station and demodulates and decrypts them so that the statistical results in the received frame can be processed by the test equipment.

At the end of the test the test equipment may instruct the mobile station to quit the test loop by sending a special command QUIT, depicted by arrow 718 in FIG. 7. The mobile station quits the test loop and acknowledges the message with an acknowledge message ACK, depicted by arrow 719. In connection with the quitting of the test loop the mobile station returns 720 from the test mode to the normal operating mode.

Figure 8:
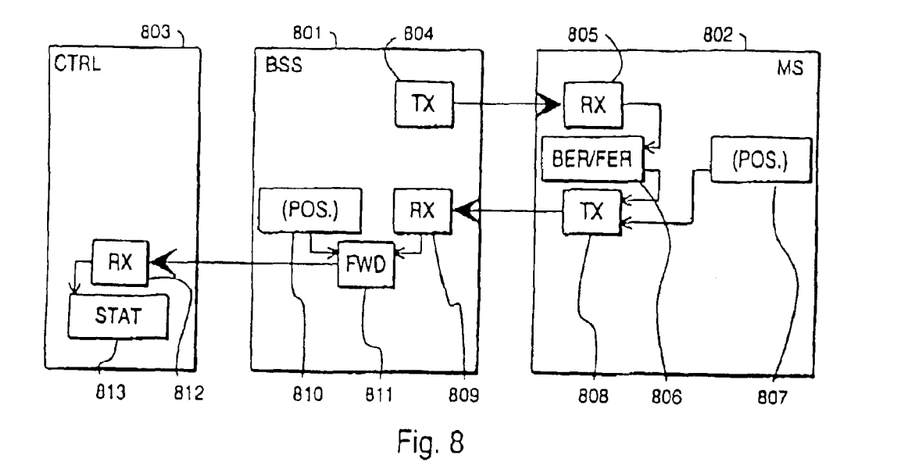
FIG. 8 illustrates the principle of operation of a base station, a mobile station and a control station according to an embodiment of the invention.

Let us now consider the application of the testing principles presented above to the measurement and optimization of general data transmission quality in a cellular radio system. FIG. 8 is a diagrammatic view of a base station subsystem (BSS) 801 of a cellular radio system, a mobile station (MS) 802 and a control unit 803 connected to the stationary parts of the cellular radio system, said control unit 803 most advantageously being a computer. The following specification can be understood as a description of certain functional parts of said devices, and as a description of a method according to a preferred embodiment of the invention.

At step 804, the test signal transmitter unit operating in the base station subsystem generates a test signal and transmits it, so that at least one mobile station in the cell of a given base station can receive it. It was already mentioned above flat the test signal can be part of a normal transmission of the base station, for instance on a broadcast channel, or it can be a signal generated particularly for testing purposes. The employed test signal can also be one of those pilot signals that the base stations transmit according to conventional methods, and/or one of the synchronising sequences that are included in the downlink bursts transmitted by the base stations.

The transmission of a test signal is advantageously arranged according to a given transmission timetable which is known to the mobile stations, or which is announced prior to transmitting the test signal.

At step 805, the radio receiver of the mobile station receives the test signal, and at step 806, a given error detection unit of the mobile station investigates whether the received test signal contains any errors. Detected errors are compiled to statistics for instance in the form of a given bit error ratio or frame erasure ratio. The value of the stored bit error ratio or frame erasure ratio can be for example a moving average from a period of the last X seconds, where the positive real number X can be chosen according to the way desired in each system. The stored value can also be the highest measured value of the bit error ratio or the frame erasure ratio during a given observation period, or some other parameter. The mobile station can also store several parameters, each of which describes a given detected feature in the error ratio of the received test signal. Advantageously the mobile station also registers the point of time that indicates when the measurements as for the error ratio of the test signal were carried out.

The mobile station can contain a location data block which at step 807 gives information of the location of the mobile station at the moment when the measurements of the error ratio of the test signal are carried out. At step 808, the transmitting unit of the mobile station compiles a message that includes at least the parameters describing the error ratio of the earlier received test signal. If the location data and/or data announcing the moment of time of carrying out the measurements are available, they can be added to the same transmission.

At step 808 that base station in whose cell the mobile station is located at the moment receives the message transmitted by the mobile station. Irrespective of whether said message contains the location data and/or time data of the mobile station, the base station subsystem can combine the received data with the self-generated location and/or time data that is generated at step 809. An advantageous method for adding the location data in the data transmitted by the mobile station is that the mobile station includes the self-transmitted data in a location update message known as such. In a cellular radio system, the location of the mobile station is known at the accuracy of the location area at least, and because at the same time as the location update message is processed, the location of the mobile station also is observed, and the parameter describing said location is easily added to the data transmitted by the mobile station and dealing with the test signal error ratio measured by the mobile station. A simple way for adding location data to the data transmitted by the mobile station is that the base station that received the data adds its own base station identifier to said data.

At step 811, the base station subsystem transmits the data that describes the test signal error ratio measured by the mobile station, the point of time when the measurement was carried out and the location of the mobile station during the measurement further to the control unit 803. Said transmitting of the data can be carried out as part of the signalling between the stationary parts of the cellular radio system, known as such. At step 812 the control unit receives the data, and at step 813 it compiles the data that is received from several mobile stations and describes the received test signal error ratio in different parts of the cellular radio system at different points of time. The described compiling of the data is known as such, because it in principle corresponds to the prior art collecting of measurement data from customized measuring receivers. The novel feature in the arrangement according to the invention is that the measurement data is not received from any specific measuring receivers, but from the mobile stations of the cellular radio system, and that the collection thereof takes place automatically via the cellular radio system. The collected data is easily arranged, by means of known methods, for instance as an error map where the number of measured errors or some other parameter describing the errors is represented as a function of the geographical location and the moment of measurement. Another novel feature is that such data can be used in the optimising and adjusting of the network, carried out both automatically and manually.

Figure 9:
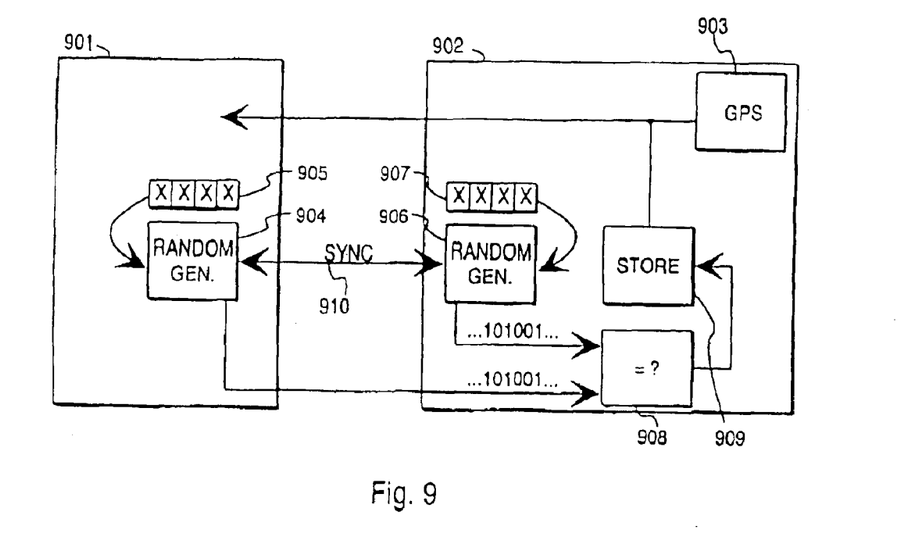
FIG. 9 illustrates the principle of applying an embodiment of the invention to the measurement of data transmission quality of a cellular radio system.

FIG. 9 illustrates an arrangement where the base station subsystem 901 transmits a pseudorandom bit sequence to the mobile station 902. In the drawing it also is assumed that the mobile station 902 comprises a positioning device 903, which can be for instance a prior art GPS receiver.

The base station subsystem 901 is provided, in a fashion known as such, a given bit sequence generator 904, which is initialised with a given seed number 905, and which thereafter generates a pseudorandom bit sequence. According to the invention, the mobile station 902 is provided with a bit sequence generator 906, which functions in a similar way and is initialised with a given seed number 907. The general principles of the generators used for generating the pseudorandom bit sequences result in that if the seed numbers 905 and 907 are equal, the generators 904 and 906 produce an exactly equal pseudorandom bit sequence.

According to the invention, the mobile station 902 also includes a reference circuit 908 and a statistical analysis and storage unit 909, which are arranged to compare the bit sequence received from the base station subsystem bit by bit with the locally generated bit sequence and to register all differences detected in the process. Moreover, from the statistical analysis and storage unit 909, there is arranged an uplink connection back to the base station subsystem in order to transmit the results from the statistics compilation. Said connection can be an uplink channel in the same data transmission connection through which the downlink signal was transmitted from the base station subsystem 901 to the mobile station 902, or it can be some other connection, such as a connection via a given uplink signalling channel.

In order to make the comparison of pseudorandom bit sequences sensible, the bit sequence generators 904 and 906 must function in a synchronised fashion, i.e. generate equal bits at equal pace. The synchronisation in the generation of bit sequences is known as such, because for example generally in spread spectrum technology, and as an application particularly in code division multiple access (CDMA) methods, the distinction of the effective signal from other competing effective signals and from noise is based on the use of the same pseudorandom spreading sequence both at the transmitting and the receiving end. In connection with the invention, there can be applied some known technology for synchronising the generation of the bit sequences. The synchronisation is -illustrated as a diagrammatic arrow 910 in FIG. 9.

The base station subsystem 901 may also include the control unit 803 illustrated in FIG. 8, or corresponding functions, i.e. collection, registration and utilisation of the data can be realised by means of internal operations in the base station subsystem. This does not, however, restrict the invention in any way, but the control unit or network element or system including corresponding functions can also be located apart from the base station subsystem, in some other part of the mobile communications system.

FIG. 9 does not give a role to a SIM included in the mobile station 902; however, it is obvious to a person skilled in the art that at least in most cellular radio systems known at the priority date of this patent application a SIM must be present in the mobile station in order for it to function normally. The invention as such does not require that a SIM should be used.

Above we have assumed that the base station which receives the uplink transmissions is die same as the base station which transmitted the test sequence to the mobile station. This is not a limiting requirement; it is perfectly possible for the mobile station to transmit its measurement reports through some other base station. For example if the reporting in the uplink direction takes place according to a timetable so that the mobile station lets the statistical information about the occurrence of errors accumulate for a certain time before transmitting the accumulated results, it may have moved away from the cell of the original transmitting base station before it is time for reporting. In order not to cause confusion in the location to which a certain measurement should be associated, such an embodiment of the invention requires that it is the mobile station which associates a certain measurement with certain location information and transmits these information parts to the network.

In an uplink connection, there can be transmitted for instance a given recorded value of the bit error ratio or frame erasure ratio, or a value deducted therefrom, such as the bit error ratio average within a given slot. In many applications attention is paid only to the fact whether the bit error ratio or the frame erasure ratio remains lower than a given predetermined limit value, in which case in the uplink direction there is only transmitted an answer of the type yes/no (is lower than the limit value/is not lower than the limit value). Because the limit values are usually defined as floating point numbers (for example $1,0 \cdot 10^{-6}$, one possibility is to transmit in the uplink direction that exponent x of the number $1,0 \cdot 10^{-x}$ which describes an upper limit value of the detected bit error ratio. For instance a transmitted number −6 indicates that the detected bit error ratio is lower than $1,0 \cdot 10^{-6}$.

The control unit illustrated in FIG. 8 can collect the statistical data transmitted by the mobile stations and received by the base stations from all around the cellular radio network. Because the statistical data describes the errors occurring in the downlink data transmission, and said errors are always connected at least to a given location area, and in future cellular radio systems even to given locations within the cells, in the control unit there is created, in the course of time, an extremely accurate and continuously updated image of how faultlessly the downlink data transmission functions in each part of the cellular radio system. Said knowledge can be utilised for instance in that within an area where the downlink data transmission seems to include an unusually high degree of errors, the transmission power of the base stations is increased, or even new base stations are built. Naturally the method according to the invention can also be applied so that testing is carried out in the area of one base station at a time, if the investigation is focused for example on the operating conditions of the base station, or on the coverage of a radio signal in a cell of the base station. In that case a centralised control unit is not necessarily needed in the system, but testing can be started even at the base station, by switching the base station to a given testing mode.

Figure 10:
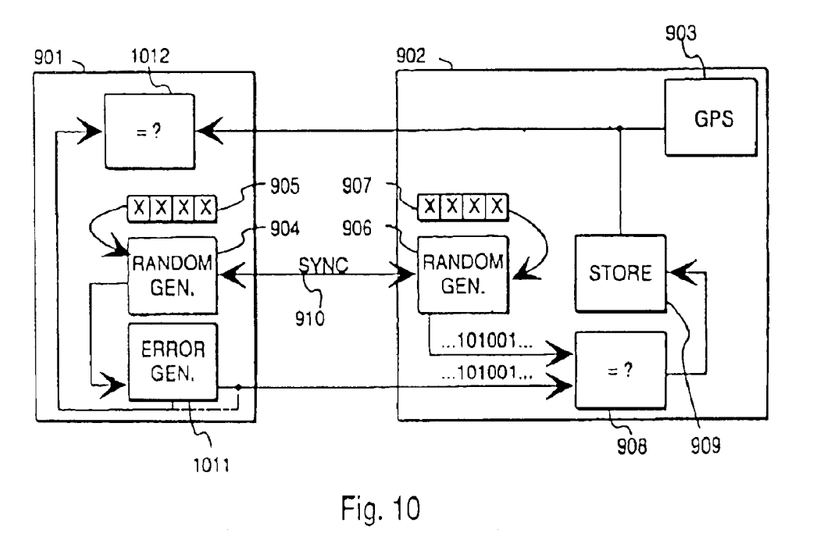
FIG. 10 illustrates a modification of the principle of FIG. 9.

FIG. 10 illustrates a modification of the above-described principle, whereby also the functionality of the error measuring arrangement can be tested. The base station subsystem includes a controllably operated error generator 1011, whereby a known error can be created in any test sequence. The error generator 1011 can generate in the test sequence errors partly at pseudorandom, i.e. so that a certain period of the test sequence contains an exactly know number of errors, but their location within said period takes place at random. The error generator 1011 can also be operated so that it generates an accurately defined bit error pattern, where for example at intervals of K bits, there is located a sequence of N bits, where the value of each M bits is changed. Here K, N and M are positive integrals, in which case the control circuit (not illustrated) controlling the operation of the error generator can accurately control the generation of errors by giving the error generator the desired values of K, N and M. Many different combinations and modifications of these operation methods also are possible.

According to the embodiment of the invention, the base station subsystem also includes a reference circuit 1012 which obtains information as to how many and what kind of errors the test sequence contains at the moment when it is transmitted to the mobile station in downlink data transmission frames. This information can be obtained either from the control data of the error generator, as is illustrated in FIG. 10 by a continuous line, or the reference circuit 1012 can receive copies of those downlink frames that are transmitted to the mobile station. The latter alternative is illustrated by a dotted line in FIG. 10. When the mobile station transmits to the base station subsystem the data describing the detected errors, said data is conducted to the reference circuit 1012, which is then able to investigate whether the data given by the mobile station corresponds to the data describing the error ratio of the test sequence during transmission. Other parts illustrated in FIG. 10 correspond to the embodiment illustrated in FIG. 9.

The procedures of setting up and tearing down of communication connections between the base stations and mobile stations for the purpose of measuring and optimizing the general data transmission quality of a cellular radio system may take place as with any normal communication connections specified in that system.

However, it is also possible to apply the specific procedures described above where only the lower protocol layers up to a certain level (e.g. the Layer 3 RR level) are involved.

The application of the invention to the measurement and optimization of the general data transmission quality of a cellular radio network has several advantages. For instance, the invention enables the adjusting and optimisation of a radio network, during the use thereof, by means of the received measuring results. Such adjusting and optimisation can be realised for instance manually or automatically. The operation of the radio network can be adjusted and optimised for example by means of various parameters, such as power levels, by adjusting the properties of adaptive antennas or by many other ways known as such.

The invention can also be applied so that a given mobile station manufacturer or distributor makes an agreement with the operator, as for the testing of the operation of the mobile stations manufactured or sold by said manufacturer or distributor, or as for the testing of a limited group of mobile stations by means of the method of the invention: the test signal can be chosen according to a fashion known by both parties only, or only the mobile stations of a given manufacturer or distributor are programmed to perform the measures required by the testing procedure. The operator who is a party to said agreement collects the data transmitted by the mobile stations, in which case there is obtained an overall view as to what degree of service quality the mobile stations belonging to the desired group can function in a cellular radio system maintained by said operator.

The features recited in the depending claims are freely combinable unless explicitly otherwise stated.

What is claimed is:

1. A method for testing the functioning of downlink data communication in a cellular radio system, comprising the steps of:

sending a test signal from a base station to at least one mobile station, receiving the test signal sent by the base station at a mobile station, comparing the test signal received at the mobile station to a known form of the test signal, producing and temporarily storing at the mobile station information about errors which were detected in the received test signal during the comparing step, sending information representing the stored information about errors from the mobile station to a base station, receiving the information sent by the mobile station at a base station, storing in the cellular radio system the information received by the base station, generating a test signal, which is a pilot signal, and which is transmitted, via a base station of the cellular radio system, to a mobile station of the cellular radio system, generating and storing at the mobile station information describing the occurrence of errors in the test signal received by the mobile station, transmitting from the mobile station to the base station a first error message describing the occurrence of errors within a given block of data of the test signal received by the mobile station, and transmitting from the base station to a certain control unit a second error message describing the first error message received from the mobile station of the cellular radio system.

2. A method according to claim 1, comprising the step of generating a pseudorandom bit sequence at the mobile station in order to produce the known form of the test signal.

3. A method according to claim 1, wherein the step of producing and temporarily storing information about errors detected in the received test signal during the comparing step comprises the step of producing and temporarily storing information about a detected bit error ratio of the received signal, and the step of sending in the uplink direction a signal representing the stored information about errors comprises the step of sending in the uplink direction a signal representing the detected bit error ratio.

4. A method according to claim 1, wherein the step of producing and temporarily storing information about errors detected in the received test signal during the comparing step comprises the step of producing and temporarily storing information about a frame erasure ratio of the received signal, and the step of sending in the uplink direction a signal representing the stored information about errors comprises the step of sending in the uplink direction a signal representing the detected frame erasure ratio.

5. A method according to claim 1, comprising the steps of:
   receiving a command of a certain first protocol level in the downlink direction, and
   in response to the received command, setting the mobile station into a test mode where no notification about an established bi-directional communication link is sent to protocol levels higher than said first protocol level.

6. A method according to claim 5, wherein said first protocol level is a Layer 3 RR level.

7. A method according to claim 1 wherein, in a mobile station equipped for converting a downlink signal to baseband and for demodulating, decrypting and channel decoding the signal converted to baseband, the step of comparing the received test signal to a known form of the test signal is performed after demodulation and decryption but prior to channel decoding.

8. A method according to claim 1 wherein, in a mobile station equipped for converting a downlink signal to baseband and for demodulating, decrypting and channel decoding the signal converted to baseband, the step of comparing the received test signal to a known form of the test signal is performed after demodulation, decryption and channel decoding.

9. A method according to claim 1, comprising the steps of:
   sending a test signal from a large number of base stations to a large number of mobile stations,
   receiving information sent by a large number of mobile stations at a large number of base stations,
   storing the information received by the base stations at a control station of the cellular radio system, and
   producing, at the control station, information representing the quality of downlink data communication in the cellular radio system.

10. A method according to claim 1, further comprising, during the step of generating the test signal, generating a pseudorandom bit sequence.

11. A method according to claim 10, further comprising the steps of:
   generating at the mobile station the same pseudorandom bit sequence that was generated during the step of generating the test signal, and
   comparing at the mobile station the self-generated pseudorandom bit sequence with the received test signal.

12. A method according to claim 1, wherein when transmitting from the mobile station to the base station the first error message, from the mobile station there is transmitted to the base station the value of the average bit error ratio or frame erasure ratio within a given block of data as detected by the mobile station.

13. A method according to claim 1, wherein when transmitting from the base station to the certain control unit the second error message, the data received from the mobile station is transmitted as such to the control unit.

14. A method according to claim 1, when transmitting from the base station to the certain control unit the second error message, a parameter describing a location of the mobile station is also transmitted to the control unit.

15. A method for testing the functioning of downlink data communication in a cellular radio system, comprising the steps of:
   sending a test signal from a base station to at least one mobile station,
   receiving the test signal sent by the base station at a mobile station,
   comparing the test signal received at the mobile station to a known form of the test signal,
   producing and temporarily storing at the mobile station, information about errors which were detected in the received test signal during the comparing step,
   sending information representing the stored information about errors from the mobile station to a base station,
   receiving-the information sent by the mobile station at a base station,
   storing in the cellular radio system the information received by the base station,
   generating a test signal which is a synchronization sequence in a downlink burst transmitted by the base station and which is transmitted, via a base station of the cellular radio system, to a mobile station of the cellular radio system,
   generating and storing at the mobile station information describing the occurrence of errors in the test signal received by the mobile station,
   transmitting from the mobile station to the base station a first error message describing the occurrence of errors within a given block of data of the test signal received by the mobile station, and
   transmitting from the base station to a certain control unit a second error message describing the first error message received from the mobile station of the cellular radio system.

16. A method according to claim 15, further comprising during the step of generating the test signal, of generating a pseudorandom bit sequence.

17. A method according to claim 15, further comprising the step of:
   generating at the mobile station the same pseudorandom bit sequence that was generated during the step of generating the test signal, and
   comparing at the mobile station the self-generated pseudorandom bit sequence with the received test signal.

18. A method for testing the functioning of downlink data communication in a cellular radio system, comprising the steps of:
   sending a test signal from a base station to at least one mobile station,
   receiving the test signal sent by the base station at a mobile station,
   comparing the test signal received at the mobile station to a known form-of the test signal,
   producing and temporarily storing at the mobile station information about errors which were detected in the received, test signal during the comparing step,
   sending information representing the stored information about errors from the mobile station to a base station,
   receiving the information sent by the mobile station at a base station,
   storing in the cellular radio system the information received by the base station,
   generating a test signal which is transmitted, via a base station of the cellular radio system, to a mobile station of the cellular radio system,
   generating and storing at the mobile station information describing the occurrence of errors in the test signal received by the mobile station, transmitting from the mobile station to the base station a first error message describing the occurrence of errors within a given block of data of the test signal received by the mobile station and a first location message describing the location of the mobile station, and transmitting from the base station to a certain control unit a second error message describing the first error message received from the mobile station of the cellular radio system.

19. A method according to claim 18, wherein during the step of transmitting the first error message from the mobile station to the base station, there is transmitted from the mobile station to the base station a location update message.

20. A system for measuring the general quality of data transmission in a cellular radio system, said system comprising a base station subsystem and a mobile station, comprising:

in the base station subsystem, means for generating a test signal and for transmitting it via a base station of the cellular radio system to the mobile station of the cellular radio system, in the mobile station, means for generating and storing data describing the occurrence of errors in the test signal received by the mobile station, in the mobile station means for transmitting a first error message to the base station subsystem, said first error message describing the occurrence of errors in a certain block of data in the test signal received by the mobile station, and a control unit for collecting such error data that describes the error messages received by the base station subsystem of the cellular radio system from the mobile stations; and in the base station subsystem means for generating data describing a location and for transmitting said data to the control unit.

21. A system according to claim 20, comprising in the base station subsystem and in the mobile station means for generating the same pseudorandom bit sequence, and in the mobile station means for comparing the pseudorandom bit sequence generated by the mobile station with the pseudorandom bit sequence received from the base station subsystem.

22. A system according to claim 20, comprising in the mobile station means for generating data describing a location of the mobile station and for transmitting said data to the base station subsystem together with the first error message.

* * * * *